(12) United States Patent
Li et al.

(10) Patent No.: US 10,437,097 B2
(45) Date of Patent: Oct. 8, 2019

(54) SPATIAL LIGHT MODULATOR AND DISPLAY DEVICE

(71) Applicant: SHANGHAI TIANMA MICRO-ELECTRONICS CO., LTD., Shanghai (CN)

(72) Inventors: Jialing Li, Shanghai (CN); Lei Niu, Shanghai (CN); Jian Xu, Shanghai (CN); Yaoyang Liu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 79 days.

(21) Appl. No.: 15/705,269

(22) Filed: Sep. 15, 2017

(65) Prior Publication Data

US 2018/0004054 A1 Jan. 4, 2018

(51) Int. Cl.

| G02F 1/1335 | (2006.01) |
|---|---|
| G02F 1/1339 | (2006.01) |
| G02F 1/1362 | (2006.01) |
| G02F 1/1368 | (2006.01) |
| G02F 1/1343 | (2006.01) |
| G02F 1/1333 | (2006.01) |

(52) U.S. Cl.
CPC ...... *G02F 1/133553* (2013.01); *G02F 1/1368* (2013.01); *G02F 1/13394* (2013.01); *G02F 1/134336* (2013.01); *G02F 1/136227* (2013.01); *G02F 1/13439* (2013.01); *G02F 1/133345* (2013.01); *G02F 1/133512* (2013.01); *G02F 2001/13398* (2013.01); *G02F 2001/133357* (2013.01); *G02F 2201/121* (2013.01); *G02F 2201/123* (2013.01); *G02F 2201/40* (2013.01)

(58) Field of Classification Search
CPC .......... G02F 1/13394; G02F 1/133553; G02F 1/136227; G02F 1/1368
See application file for complete search history.

(56) References Cited

U.S. PATENT DOCUMENTS

| 2005/0200784 A1* | 9/2005 | Kume ............... G02F 1/133555 349/130 |
|---|---|---|
| 2007/0147215 A1 | 6/2007 | Sakaguchi et al. |

(Continued)

FOREIGN PATENT DOCUMENTS

| CN | 101952771 A | 1/2011 |
|---|---|---|
| CN | 105892180 A | 8/2016 |

*Primary Examiner* — Dung T Nguyen
(74) *Attorney, Agent, or Firm* — Kilpatrick Townsend & Stockton LLP

(57) ABSTRACT

Disclosed are a spatial light modulator and a display device, where 2*2 adjacent pixel electrodes are a pixel group, through-holes corresponding to the respective pixel electrodes are located proximate to the center of the pixel group, and a photo spacer is located at the center of the pixel group, so that the photo spacer can overlap with the through-holes, or the photo spacer can be arranged in close proximity to the through-holes. If the photo spacer overlaps with the through-holes, then a black matrix layer covering the photo spacer, and a black matrix layer covering the surrounding of the photo spacer may cover at least a part of the through-holes; and if the photo spacer is arranged in close proximity to the through-holes, then the black matrix layer covering the surrounding of the photo spacer may cover at least a part of the through-holes.

19 Claims, 18 Drawing Sheets

(56) References Cited

U.S. PATENT DOCUMENTS

| | | | |
|---|---|---|---|
| 2008/0111964 A1* | 5/2008 | Shirasaka | G02F 1/13394 |
| | | | 349/155 |
| 2013/0021285 A1* | 1/2013 | Kimura | G02F 1/13338 |
| | | | 345/173 |
| 2013/0050126 A1 | 2/2013 | Kimura et al. | |
| 2017/0031195 A1* | 2/2017 | Chen | G02F 1/13394 |
| 2018/0188601 A1* | 7/2018 | Yu | G02F 1/133553 |

* cited by examiner

SPATIAL LIGHT MODULATOR AND DISPLAY DEVICE

CROSS-REFERENCE TO RELATED APPLICATION

This application claims priority of Chinese Patent Application No. 201710353166.5, filed on May 18, 2017, which is hereby incorporated by reference in its entirety.

FIELD

The present disclosure relates to the field of display technologies, and particularly to a spatial light modulator and a display device.

BACKGROUND

Unlike other 3D display technologies, a spatial light modulator which is a core device reproduces a 3D stereoscopic view of an original object in a holographic display technology. The holographic display technology is characterized in that digital holographic information recording amplitude and phase information of a light wave of the object is loaded into the spatial light modulator, and the light wave of the original object is reproduced using a holographic photoelectric reproduction technology.

The spatial light modulator is a photoelectric device which can be controlled by a signal of a signal source to modulate some parameter of the light wave, e.g., to modulate the amplitude as a result of absorption, to modulate the phase as a function of the refractive index, to modulate the polarization state as a result of rotating a polarization plane, etc., so that the amplitude and phase information of the light wave of the object carried in the signal of the signal source is written into an incident reference light wave. An output light wave thereof is a spatial and temporal function varying with the control signal.

Existing spatial light modulators for holographic displaying generally include a Liquid Crystal Spatial Light Modulator (LC-SLM), a Digital Micro-mirror Device (DMD), and a Photo Reflective Crystal (PRC), where an operating principle of the liquid crystal spatial light modulator is to illuminate a reference light wave onto the liquid crystal spatial light modulator, so that the liquid crystal spatial light modulator is controlled by a signal of a signal source to control liquid crystals to be deflected, using an electric field, to thereby control a light wave to be output, that is, the reference light wave is modulated and then output by the liquid crystal spatial light modulator. The liquid crystal spatial light modulator can be categorized into transmitting and reflecting liquid crystal spatial light modulators dependent upon how the reference light wave is input. FIG. 1A illustrates a schematic diagram of a light path in a transmitting liquid crystal spatial light modulator, where a reference light wave is input to one side of the liquid crystal spatial light modulator 1, and an output light wave modulated by liquid crystals is output from the other side thereof. FIG. 1B illustrates a schematic diagram of a light path in a reflecting liquid crystal spatial light modulator, where a reference light wave is input to and reflected by one side of the liquid crystal spatial light modulator 1, and then an output light wave produced after the reflected light is modulated by liquid crystals is still output from the input side.

FIG. 2A illustrates a structural diagram of a conventional reflecting liquid crystal spatial light modulator, which is a cross sectional view of the structure of the conventional reflecting liquid crystal spatial light modulator, where the structure includes an array substrate 10 and an upper substrate 20, which are arranged opposite to each other, and a liquid crystal layer 30 and photo spacers 40, which are located between the array substrate 10 and the upper substrate 20; a common electrode 21 and a black matrix layer 22 are arranged on the upper substrate 20, and a plurality of pixel electrodes 11, a planarization layer 12 covering the pixel electrodes 11, and reflecting electrodes 13 located on the planarization layer 12 and corresponding respectively to the respective pixel electrodes 11 are arranged on the array substrate 10. In order to increase a storage capacitance, the reflecting electrodes 13 are electrically connected with their corresponding pixel electrodes 11 through through-holes (first through-holes) V running through the planarization layer 12. FIG. 2B illustrates a schematic top view of a part of the conventional reflecting liquid crystal spatial light modulator, where a photo spacer 40 is placed among four adjacent through-holes (first through-holes) V; and since the photo spacer 40 may have such an influence on the distribution of the electric field around it that normal displaying is impossible in the majority of the area proximate to the photo spacer 40, the black matrix layer 22 needs to cover the photo spacer 40, and the area around the photo spacer 40, and the black matrix layer 22 further needs to cover the through-holes (first through-holes) V, thus degrading an aperture opening ratio in the existing spatial light modulator.

SUMMARY

In view of this; the present disclosure provides a spatial light modulator and a display device so as to improve an aperture opening ratio in the spatial light modulator.

The present disclosure provides a spatial light modulator including: an array substrate and an upper substrate, which are arranged opposite to each other, and a liquid crystal layer and a photo spacer, which are located between the array substrate and the upper substrate; a plurality of pixel electrodes arranged in a matrix, a planarization layer covering the pixel electrodes, and reflecting electrodes located on the planarization layer and corresponding to each of the pixel electrodes are arranged on the array substrate; and each of the reflecting electrodes is electrically connected with its corresponding pixel electrode through a first through-hole running through the planarization layer; and 2*2 adjacent pixel electrodes are a pixel group, a through-hole corresponding to each of the pixel electrodes is located proximate to a center of the pixel group, and the photo spacer is located at the center of the pixel group.

Correspondingly the present disclosure further provides a display device including the spatial light modulator according to some embodiments of the application.

In the spatial light modulator and the display device as described above according to the embodiments of the application, 2*2 adjacent pixel electrodes are a pixel group, through-holes corresponding to the respective pixel electrodes are located proximate to the center of the pixel group, and a photo spacer is located at the center of the pixel group, so that the photo spacer can overlap with the through-holes, or the photo spacer can be arranged in close proximity to the through-holes. If the photo spacer overlaps with the through-holes, then a black matrix layer covering the photo spacer, and a black matrix layer covering the surrounding of the photo spacer may cover at least a part of the through-holes; and if the photo spacer is arranged in close proximity to the through-holes, then the black matrix layer covering the surrounding of the photo spacer may cover at least a part of the through-holes (first through-holes) V. As compared with the prior art in which the black matrix layer covering the through-holes does not overlap with the black matrix layer covering the photo spacer, the area of the black matrix layer can be significantly reduced to thereby improve the aperture opening ratio in the spatial light modulator.

DETAILED DESCRIPTION

Figure 1A:
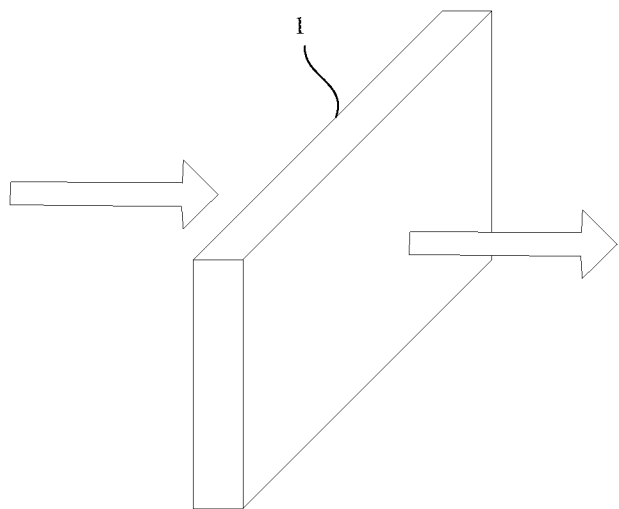
FIG. 1A illustrates a schematic diagram of a light path in a transmitting liquid crystal spatial light modulator.
Figure 1B:
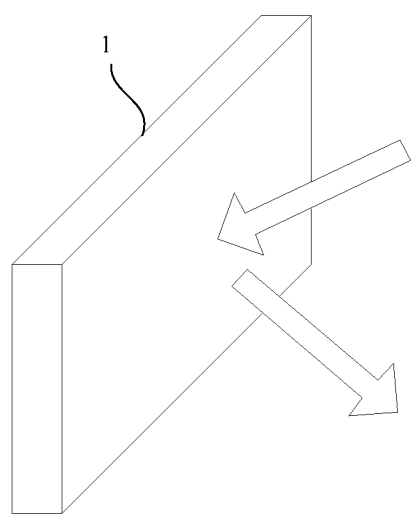
FIG. 1B illustrates a schematic diagram of a light path in a conventional reflecting liquid crystal spatial light modulator.
Figure 2A:
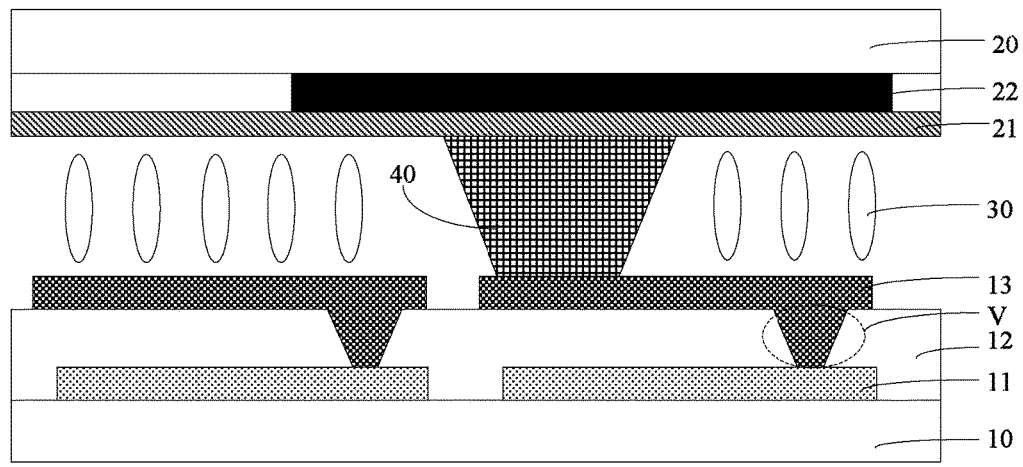
FIG. 2A illustrates a cross sectional view of the structure of the conventional reflecting liquid crystal spatial light modulator.
Figure 2B:
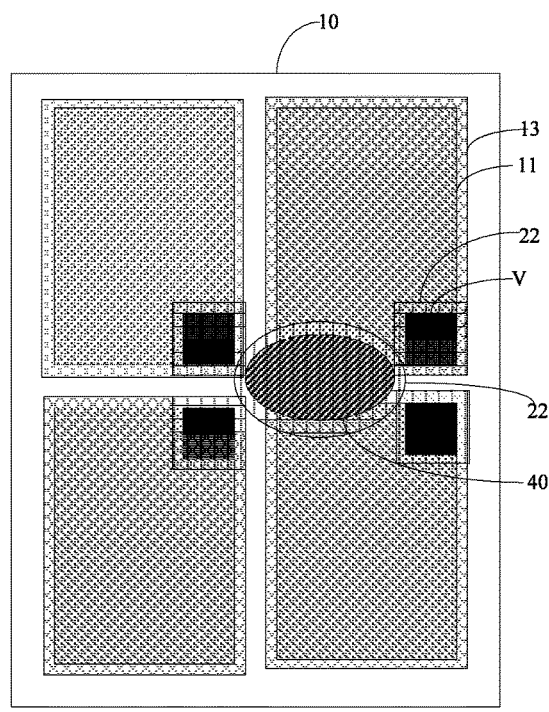
FIG. 2B illustrates a schematic top view of a part of the conventional reflecting liquid crystal spatial light modulator.

In order to make the objects, technical solutions, and advantages of the application more apparent, the application will be described below in further details with reference to the drawings, and apparently embodiments to be described below are only a part but not all of the embodiments of the application. Based upon the embodiments here of the application, all the other embodiments which can occur to those ordinarily skilled in the art without any inventive effort shall fall into the scope of the application as claimed.

The shapes and sizes of respective components in the drawings are not intended to reflect their real proportions, but only intended to illustrate the disclosure of the application.

Figure 3:
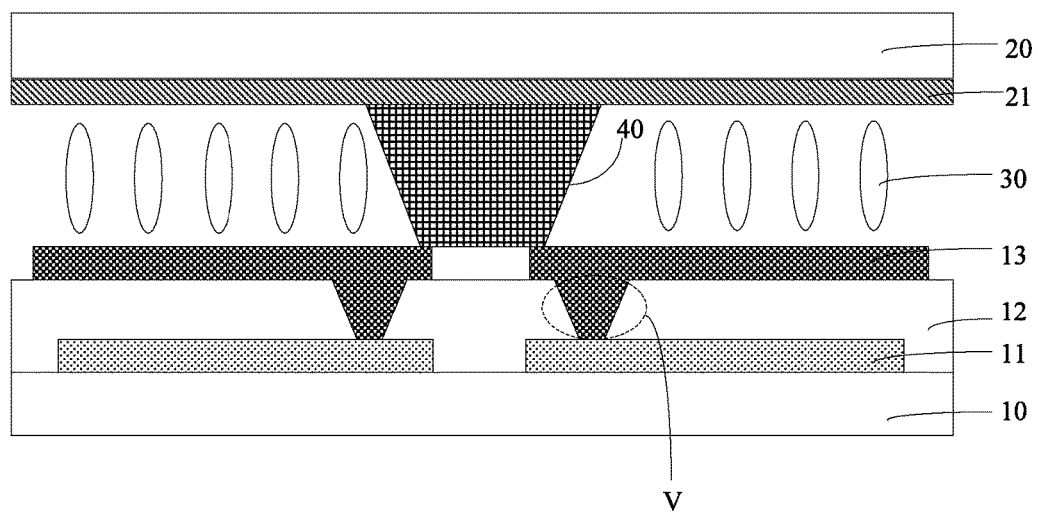
FIG. 3 is a schematic structural diagram of a cross section of a spatial light modulator according to some embodiments of the application.

A spatial light modulator according to some embodiments of the application is as illustrated in FIG. 3 which is a schematic structural diagram of a cross section of a spatial light modulator according to some embodiments of the application, where the structure includes an array substrate 10 and an upper substrate 20, which are arranged opposite to each other, and a liquid crystal layer 30 and a photo spacer 40, which are located between the array substrate and the upper substrate; and a plurality of pixel electrodes 11 arranged in a matrix, a planarization layer 12 covering the pixel electrodes 11, and reflecting electrodes 13 located on the planarization layer 12 and corresponding respectively to the respective pixel electrodes 11 are arranged on the array substrate 10, and the respective reflecting electrodes 13 are electrically connected with their corresponding pixel electrodes 11 through through-holes (first through-holes) V which run through the planarization layer 12.

Figure 4A:
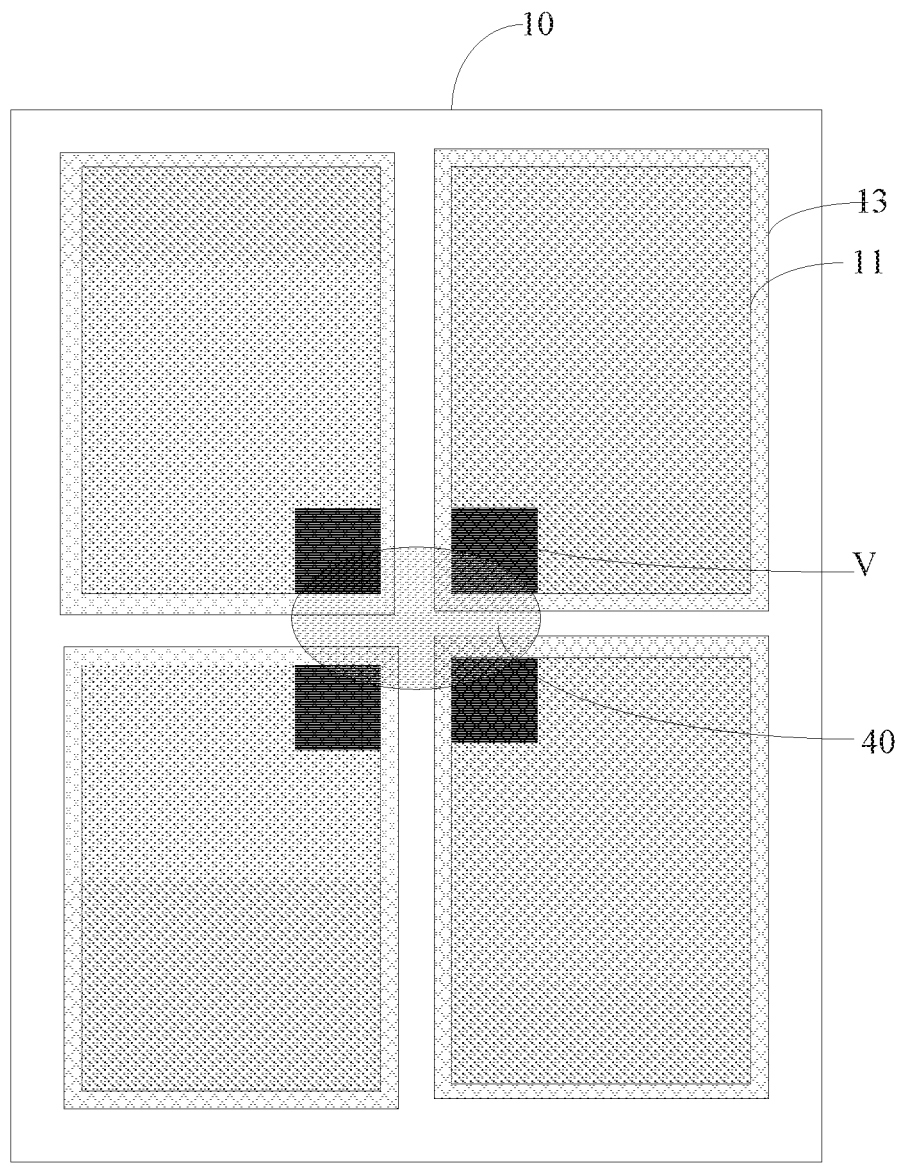
FIG. 4A is a schematic cross sectional view of a part of a spatial light modulator according to some embodiments of the application.

FIG. 4A illustrates a schematic cross sectional view of a part of a spatial light modulator according to some embodiments of the application, where 2*2 adjacent pixel electrodes 11 are a pixel group, through-holes (first through-holes) V corresponding to the respective pixel electrodes 11 are located proximate to the center area of the pixel group, and a photo spacer 40 is located at the center area of the pixel group.

In the spatial light modulator according to the embodiment of the application as illustrated in FIG. 4A, the 2*2 adjacent pixel electrodes 11 are a pixel group, the through-holes (first through-holes) V corresponding to the respective pixel electrodes 11 are arranged proximate to the center area of the pixel group, and the photo spacer 40 is located at the center area of the pixel group, so that the photo spacer 40 can overlap with the through-holes (first through-holes) V, or the photo spacer 40 can be arranged in close proximity to the through-holes (first through-holes) V. If the photo spacer 40 overlaps with the through-holes (first through-holes) V, then a black matrix layer covering the photo spacer 40, and a black matrix layer covering the surrounding of the photo spacer 40 may cover at least a part of the through-holes; and if the photo spacer 40 is arranged in close proximity to the through-holes (first through-holes) V, then the black matrix layer covering the surrounding of the photo spacer 40 may cover at least a part of the through-holes (first through-holes) V. As compared with the prior art in which the black matrix layer covering the through-holes does not overlap with the black matrix layer covering the photo spacer, the area of the black matrix layer can be significantly reduced to thereby improve the aperture opening ratio in the spatial light modulator.

Moreover in the embodiment of the application, the through-holes (first through-holes) V corresponding to the respective pixel electrodes 11 are arranged proximate to the center area of the pixel group, and the photo spacers 40 is arranged at the center area of the pixel group, so that the black matrix layer can have the same area occupied in the respective pixels in the pixel group as opposed to the prior art in which the black matrix layer has a larger area occupied in some pixel, and a smaller area occupied in some pixel, thus making the areas of the openings in the pixels vary from each other, so some embodiments of the application can further address the problem of non-uniform display brightness arising from the varying areas of the openings in the pixels in the prior art.

Optionally in the spatial light modulator according to some embodiments of the application, 2*2 adjacent pixel electrodes 11 refer to the four pixel electrodes 11 being located in two adjacent rows and two adjacent columns, as illustrated in FIG. 4A.

Optionally in the spatial light modulator according to some embodiments of the application, the pixel electrodes corresponding to the respective reflecting electrodes refers to one pixel electrode corresponding to one reflecting electrode, and also one reflecting electrode corresponding to only one pixel electrode.

Figure 4B:
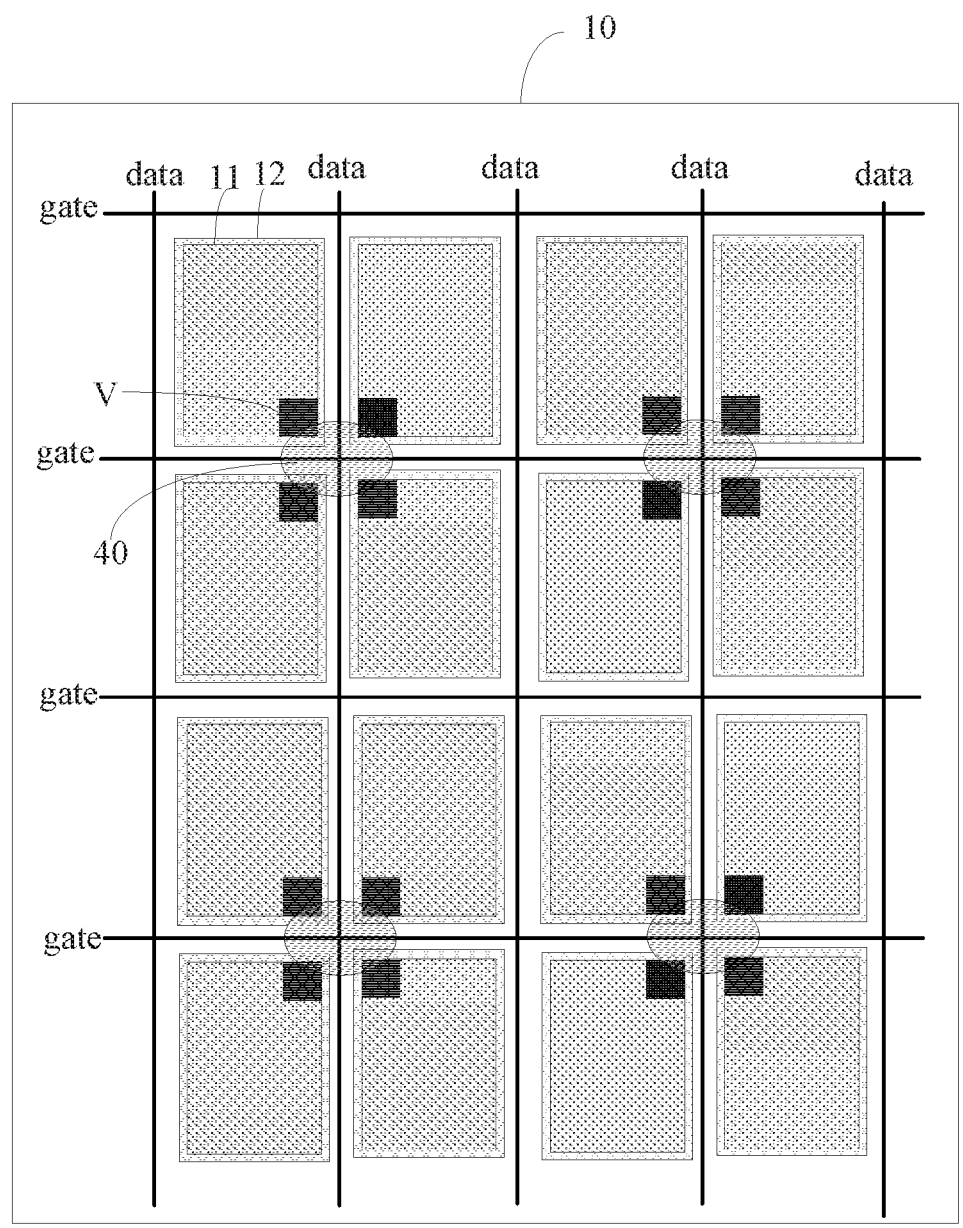
FIG. 4B is a schematic cross sectional view of a part of another spatial light modulator according to some embodiments of the application.

Optionally in the spatial light modulator according to some embodiments of the application, FIG. 4B illustrates a schematic cross sectional view of a part of another spatial light modulator according to some embodiments of the application, where a plurality of data lines Data extending in the column direction, and a plurality of scan lines Gate extending in the row direction, are further arranged on the array substrate 10 and the plurality of pixel electrodes 11 arranged in the matrix are defined by the scan lines Gate and the data lines Data, where the pixel electrodes 11 are located in respective zones defined by the scan lines Gate and the data lines Data.

Figure 5:
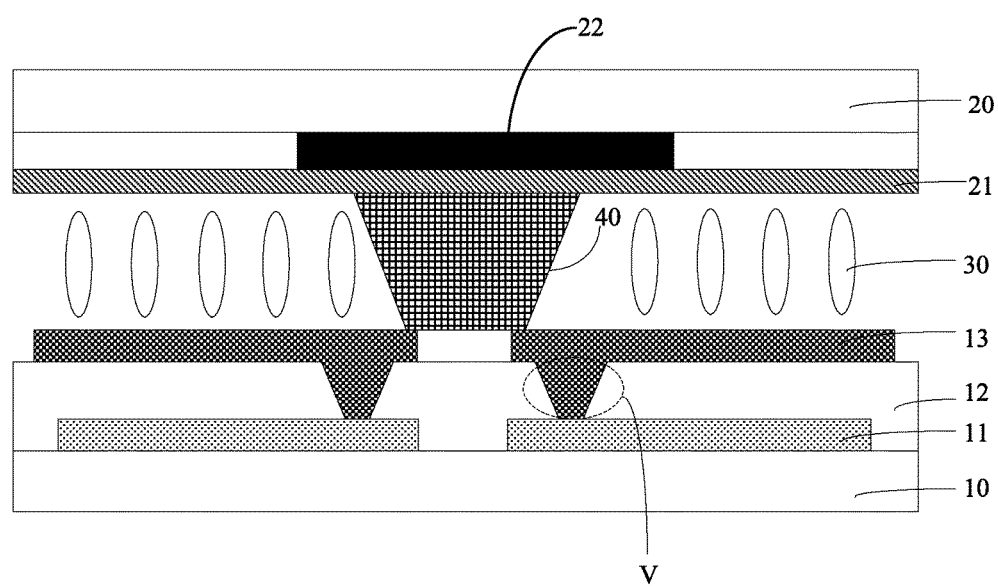
FIG. 5 is a schematic structural diagram of a cross section of another spatial light modulator according to some embodiments of the application.

Optionally in the spatial light modulator according to some embodiments of the application, since normal displaying is impossible where the photo spacer 40 and the through-holes (first through-holes) V are located, as illustrated in FIG. 5 which is a schematic structural diagram of a cross section of another spatial light modulator according to some embodiments of the application, the spatial light modulator further includes a black matrix layer 22 located between the photo spacer 40 and the upper substrate 20, and an orthographic projection of the black matrix layer 22 onto the array substrate 10 covers orthographic projections of the isolation layer 40 and the through-holes (first through-holes) V onto the array substrate 10. Generally an edge of the black matrix layer 22 may go beyond edges of the photo spacer 40 and the through-holes (first through-holes) V by some width. Since the black matrix layer 22 covering the photo spacer 40, and the black matrix layer 22 covering the surrounding of the photo spacer 40 can cover at least a part of the through-holes (first through-holes) V, the area of the black matrix layer 22 can be significantly reduced to thereby improve the aperture opening ratio in the spatial light modulator as compared with the prior art in which the black matrix layer 22 covering the through-holes does not overlap with the black matrix layer 22 covering the photo spacer 40.

Optionally in the spatial light modulator according to some embodiments of the application, generally the photo spacer is fixed on a side of the black matrix layer. The side faces to the liquid crystal layer, that is, the isolators are formed after the black matrix layer is formed on the upper substrate. Of course; the black matrix layer can alternatively be arranged on the array substrate, although some embodiments of the application will not be limited thereto.

Optionally in the spatial light modulator according to some embodiments of the application, as illustrated in FIG. 3 and FIG. 5, a common electrode 21 is further arranged on the upper substrate 20. An operating principle of the spatial light modulator is to apply voltage to the pixel electrodes 11 and the common electrode 21 so that an electric field is created between the pixel electrodes 11 and the common electrode 21, and liquid crystal molecules are deflected by the electric field, where they are deflected differently with the varying electric field so that varying light is output from the differently deflected liquid crystal molecules, thus enabling the light to be modulated. The voltage on the respective pixel electrodes 11 is determined by digital holographic information, in which amplitude and phase information of a light wave of an object is recorded, received by the spatial light modulator.

Optionally in the spatial light modulator according to some embodiments of the application; four pixel electrodes in a pixel group may correspond to the same through-hole, that is, the four pixel electrodes are electrically connected with their corresponding reflecting electrodes through the same through-hole while the four reflecting electrodes are insulated from each other, and the four pixel electrodes are insulated from each other; or of course; the four pixel electrodes in the pixel group may alternatively correspond to four through-holes, that is, one pixel electrode corresponds to one through-hole, and the respective pixel electrodes are electrically connected with their reflecting electrodes through their corresponding through-holes. A particular relative positional relationship between a photo spacer and through-holes in the spatial light modulator according to some embodiments of the application will be described below in particular embodiments of the application.

Firstly an instance in which four pixel electrodes in a pixel group correspond to four through-holes will be described below in details.

Figure 6A:
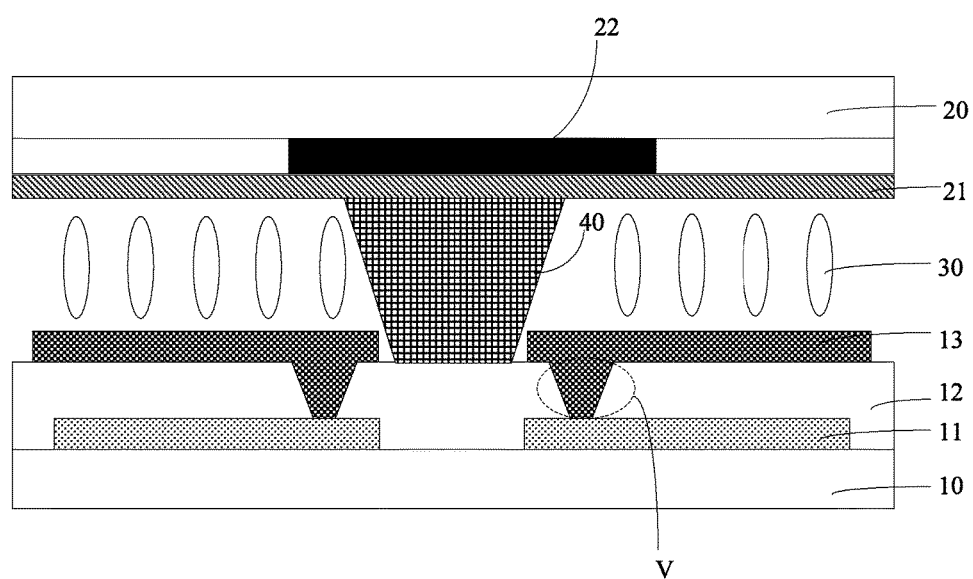
FIG. 6A is a schematic structural diagram of a cross section of a further spatial light modulator according to some embodiments of the application.
Figure 6B:
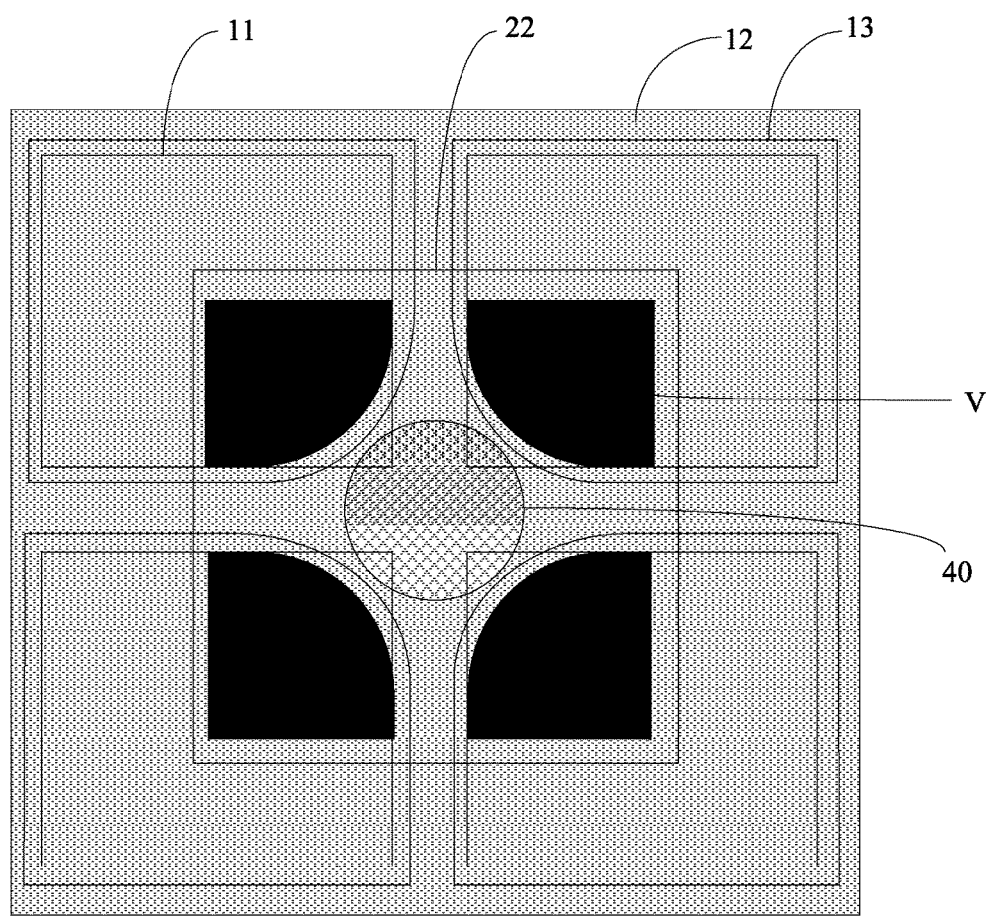
FIG. 6B is a schematic top view of the spatial light modulator as illustrated in FIG. 6A.

Optionally in the spatial light modulator according to some embodiments of the application; FIG. 6A illustrates a schematic structural diagram of a cross section of a further spatial light modulator according to some embodiments of the application, and FIG. 6B illustrates a schematic top view of the spatial light modulator as illustrated in FIG. 6A, where each of the pixel electrodes 11 in the pixel group corresponds to one of the through-holes (first through-holes) V, the pixel group corresponds to the four through-holes (first through-holes) V, and the respective through-holes (first through-holes) V are located proximate to the center of the pixel group; and the photo spacer 40 is located on the planarization layer 12 among the four through-holes (first through-holes) V. The black matrix layer 22 covers the photo spacer 40 and the through-holes (first through-holes) V, so that the black matrix layer 22 covering the surrounding of the photo spacer 40 overlaps with the black matrix layer covering the surroundings of the through-holes, thus decreasing the area occupied by the black matrix layer 22 so as to improve the aperture opening ratio. Moreover the photo spacer 40 is located on the planarization layer 12 among the four through-holes (first through-holes) V so that the four reflecting electrodes 13 in the pixel group are blocked from each other by the photo spacer 40 at the center of the pixel group to thereby avoid the problem of short-circuiting between the reflecting electrodes 13.

Figure 7A:
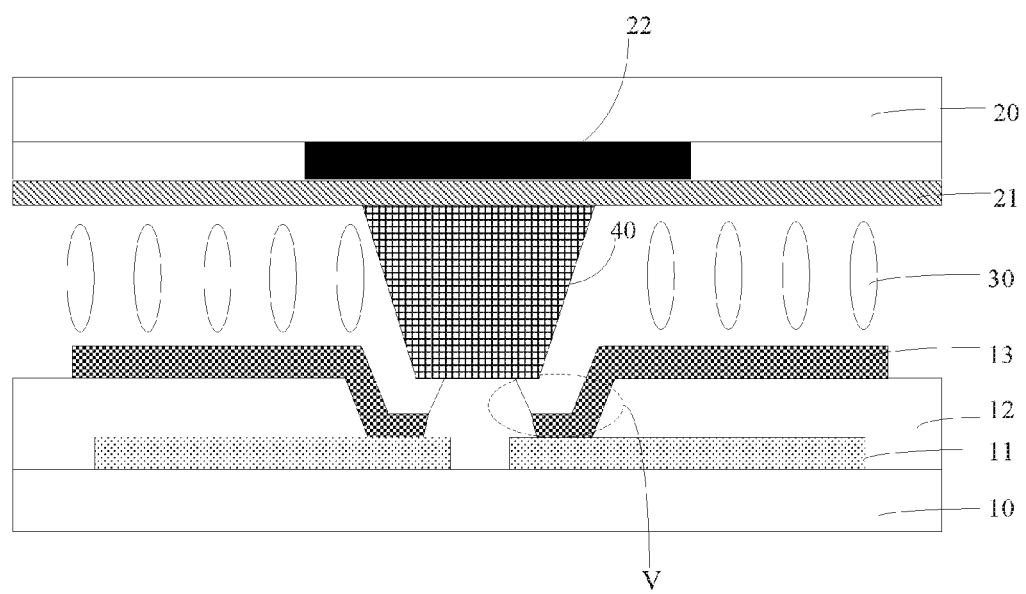
FIG. 7A is a schematic structural diagram of a cross section of a further spatial light modulator according to some embodiments of the application.
Figure 7B:
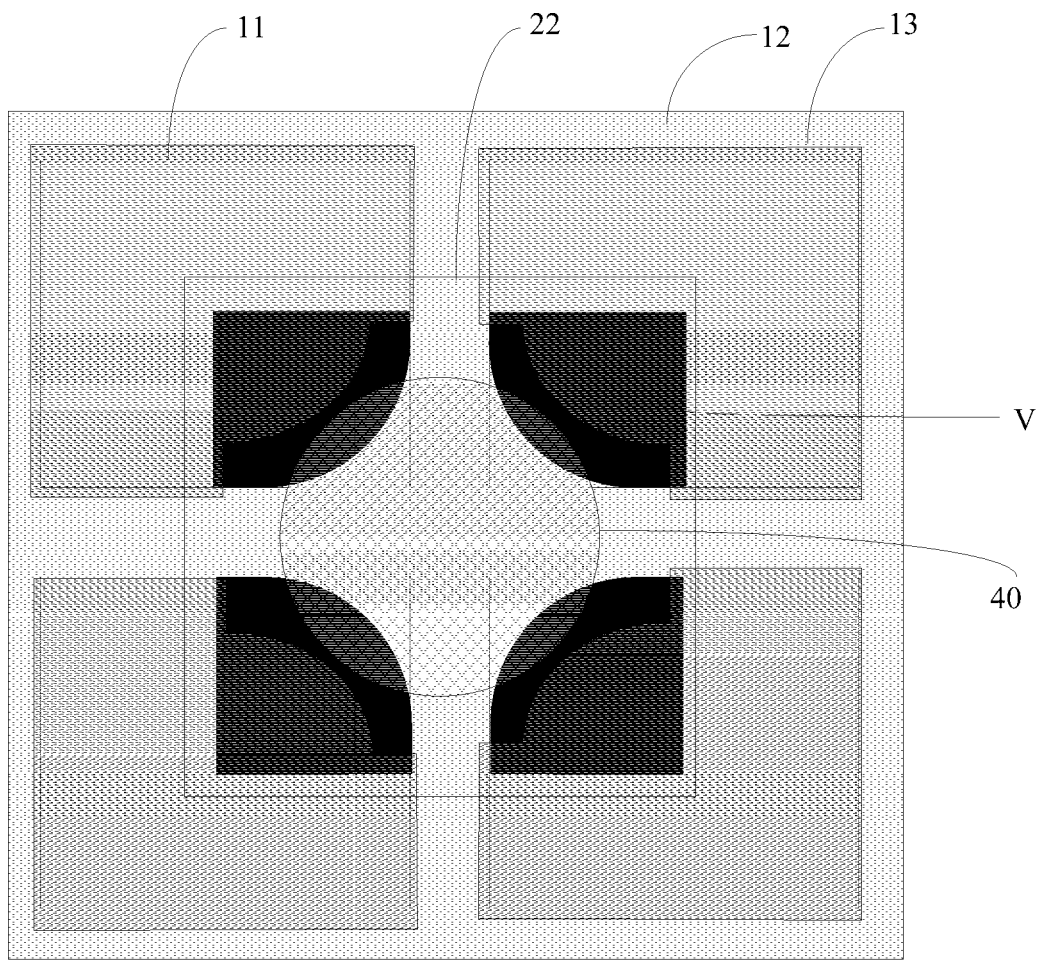
FIG. 7B is a schematic top view of the spatial light modulator as illustrated in FIG. 7A.

Optionally in the spatial light modulator according to some embodiments of the application, FIG. 7A illustrates a schematic structural diagram of a cross section of a further spatial light modulator according to some embodiments of the application, and FIG. 7B illustrates a schematic top view of the spatial light modulator as illustrated in FIG. 7A; and an orthographic projection of the photo spacer 40 onto the array substrate 10 partially overlaps with orthographic projections of the four through-holes (first through-holes) V corresponding to the pixel group onto the array substrate 10.

The photo spacer overlaps with the through-holes so that the area occupied by the black matrix layer 22 can be further reduced to thereby further improve the aperture opening ratio in the spatial light modulator.

Optionally in the spatial light modulator according to some embodiments of the application, as illustrated in FIG. 6B and FIG. 7B, any adjacent two of the four through-holes (first through-holes) V corresponding to the pixel group are axial symmetry, so that the area occupied by each through-hole (first through-hole) V in the pixel can be made the same, and the photo spacer 40 is located among the four through-holes (first through-holes) V, so that the area occupied by the photo spacer 40 in each pixel can also be made the same, thus resulting in the same aperture opening ratio throughout the pixels so as to ensure uniform brightness of a picture to be displayed.

Optionally in the spatial light modulator according to some embodiments of the application, the shape of the opening of the through-hole may be any shape, although some embodiments of the application will not be limited thereto.

Figure 7C:
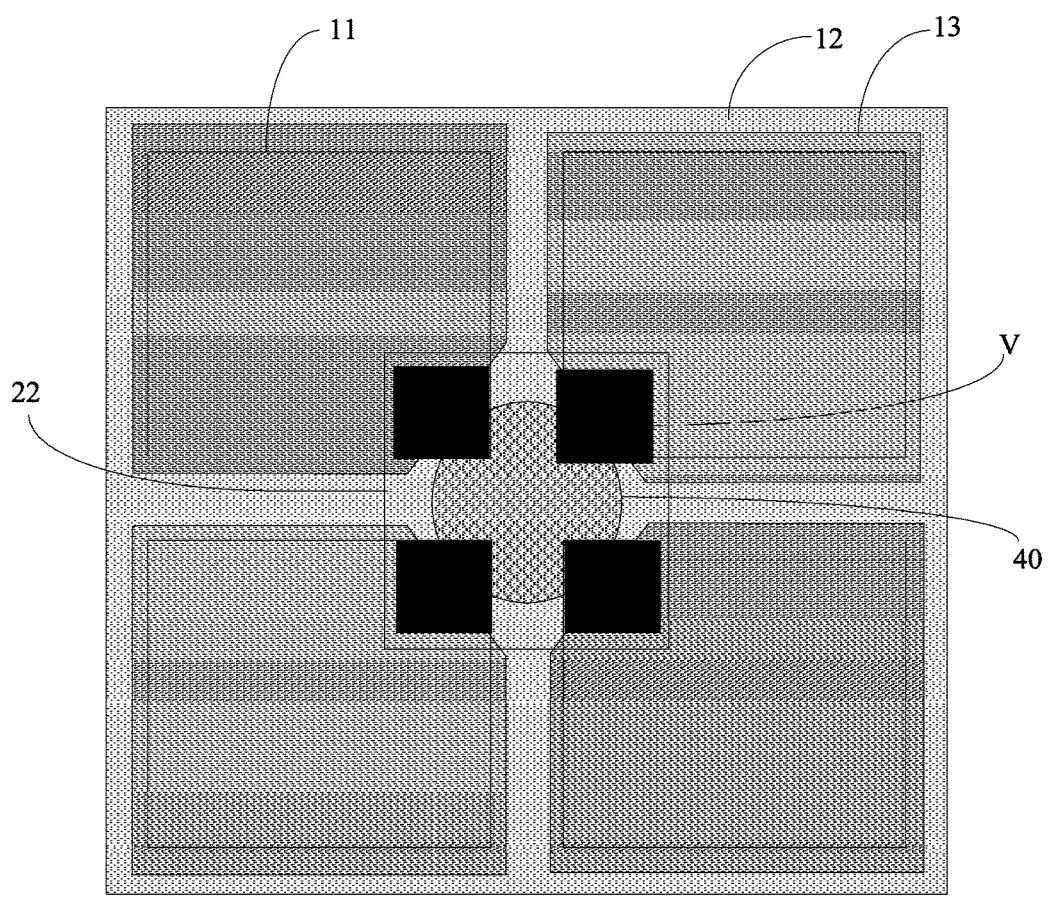
FIG. 7C is another schematic top view of the spatial light modulator as illustrated in FIG. 7A.
Figure 7D:
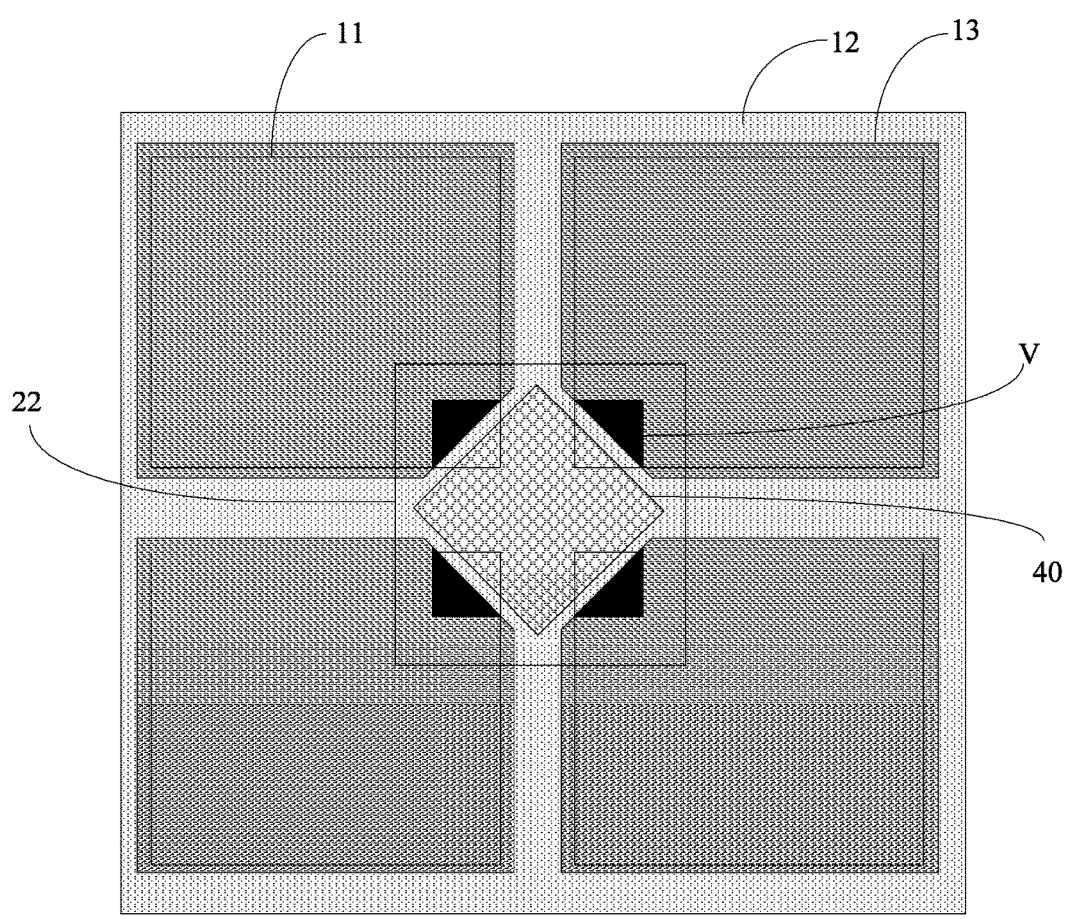
FIG. 7D is a further schematic top view of the spatial light modulator as illustrated in FIG. 7A.

Optionally in the spatial light modulator according to some embodiments of the application, FIG. 7C illustrates another schematic top view of the spatial light modulator as illustrated in FIG. 7A, where the shape of the opening of the through-hole (first through-hole) V is rectangle, but in order to increase the contact area between the photo spacer 40 and the planarization layer 13, the area of the through-hole (first through-hole) V can be reduced as appropriate and FIG. 7D illustrates a further schematic top view of the spatial light modulator as illustrated in FIG. 7A, where the shape of the opening of the through-hole (first through-hole) V is triangle. If the shape of the opening of the through-hole (first through-hole) V is triangle, then preferably the longer side of the triangle will be made proximate to the center of the pixel group, so that there is a larger area of the planarization layer 13 among the four through-holes, thus increasing the contact area between the photo spacer 40 and the planarization layer 13 to thereby improve the stability of the photo spacer 40.

Figure 8:
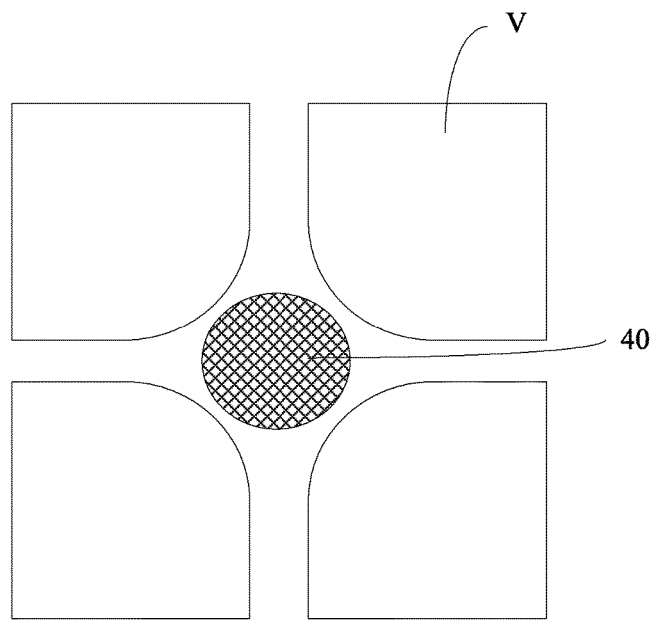
FIG. 8 is a schematic diagram of the shape of an opening in a through-hole in a spatial light modulator according to some embodiments of the application.

Optionally in the spatial light modulator according to some embodiments of the application, as illustrated in FIG. 6B, FIG. 7B, and FIG. 8, FIG. 8 illustrates a schematic diagram of the shape of the openings in the through-holes in the spatial light modulators as illustrated in FIG. 6B and FIG. 7B according to some embodiments of the application, where the shape of the opening of the through-hole (first through-hole) V is such a rectangle that a corner thereof proximate to the photo spacer 40 is rounded. As compared with the opening of the through-hole (first through-hole) V being shaped into a rectangle with four right-angle corners, there will be a larger area of the planarization layer 13 among the four through-holes to thereby increase the contact area between the photo spacer 40 and the planarization layer 13 so as to improve the stability of the photo spacer 40.

Optionally in the spatial light modulator according to some embodiments of the application, as illustrated in FIG. 7D, the shape of the orthographic projection of the photo spacer 40 onto the array substrate is a central symmetric pattern. The center of the photo spacer 40 is located at the center of the pixel group so that there is the same area occupied by the photo spacer 40 in each pixel to thereby ensure the same aperture opening ratio in each pixel.

Optionally in the spatial light modulator according to some embodiments of the application, in the instance in which four pixel electrodes in a pixel group correspond to four through-holes, the shape of the opening of the through-hole may be preset under a real condition, for example, it will be easier to fabricate a through-hole with an opening in a more simple shape, from the perspective of a fabrication process thereof; and the opening of the through-hole may be shaped for the largest contact area between the photo spacer and the planarization layer while the reflecting electrodes are electrically connected with the pixel electrodes. Moreover the shape of the orthographic projection of the photo spacer onto the array substrate can also be designed according to the shape of the opening of the through hole, for example, if an area surrounded by four through-holes is circular, then the photo spacer may be designed into a cylindrical shape, and if the area surrounded by four through-holes is rectangle, then the photo spacer may be designed into a rectangular column, although some embodiments of the application will not be limited thereto.

Then an instance in which four pixel electrodes in a pixel group correspond to one through-hole will be described below in details.

Figure 9A:
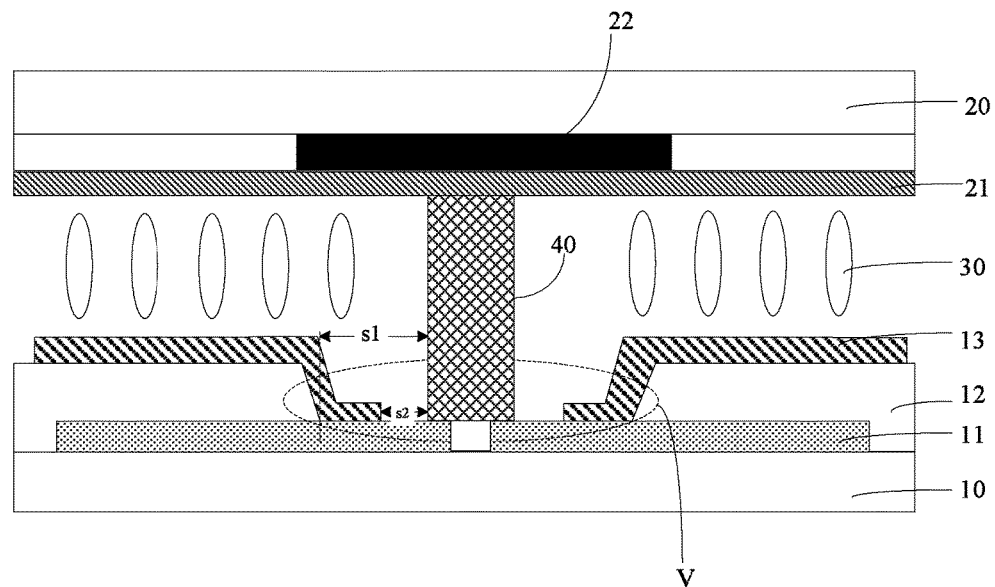
FIG. 9A is a schematic structural diagram of a cross section of a further spatial light modulator according to some embodiments of the application.
Figure 9B:
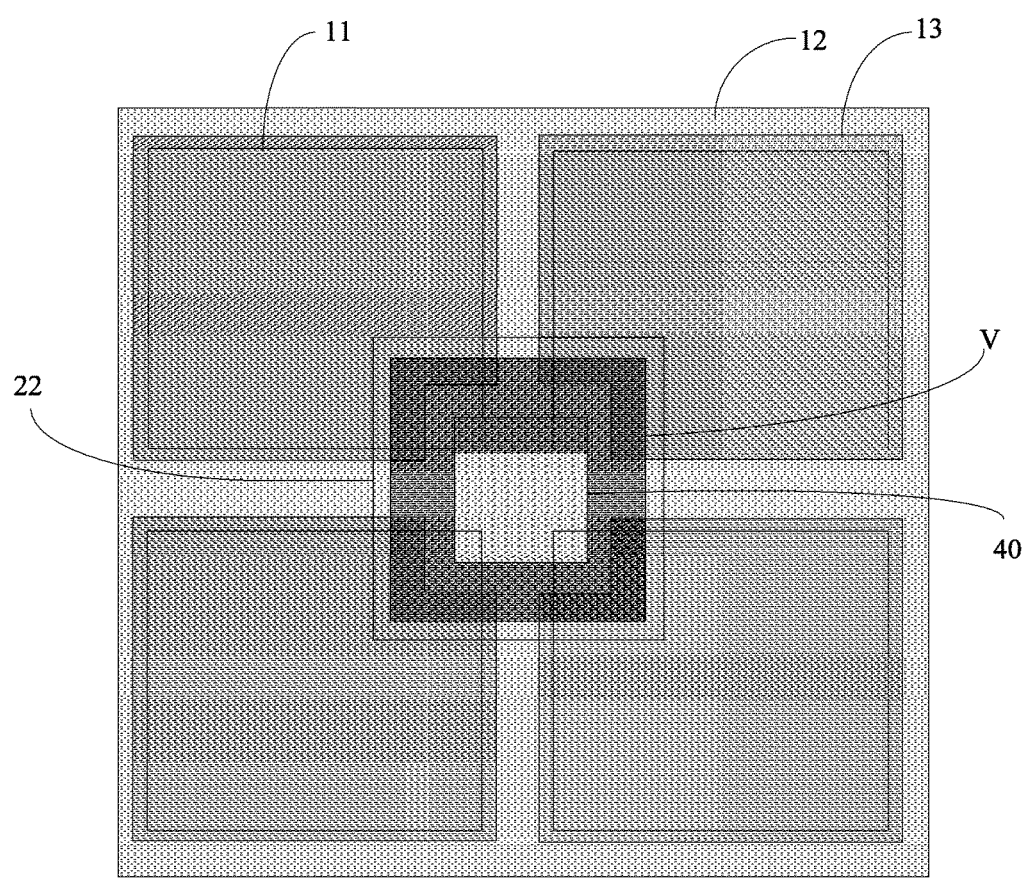
FIG. 9B is a schematic top view of the spatial light modulator as illustrated in FIG. 9A.
Figure 9C:
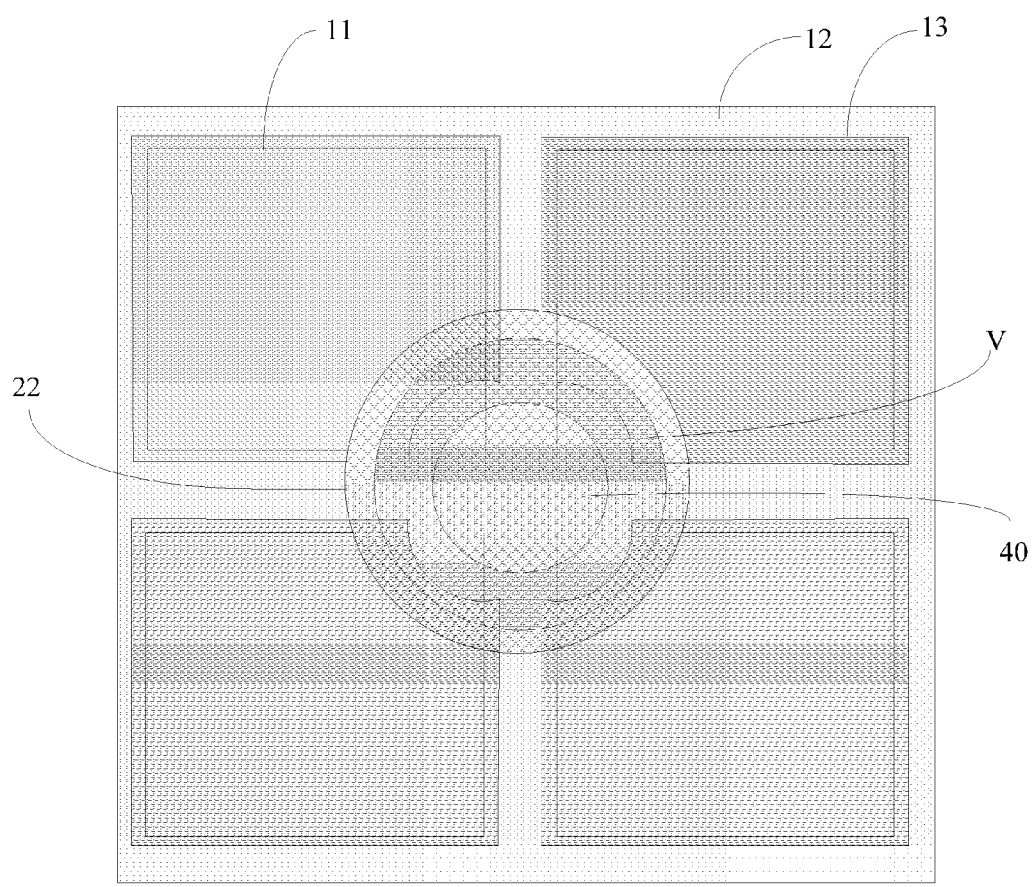
FIG. 9C is another schematic top view of the spatial light modulator as illustrated in FIG. 9A.

Optionally in the spatial light modulator according to some embodiments of the application, as illustrated in FIG. 9A to FIG. 9C, FIG. 9A illustrates a schematic structural diagram of a cross section of a further spatial light modulator according to some embodiments of the application, FIG. 9B illustrates a schematic top view of the spatial light modulator as illustrated in FIG. 9A, and FIG. 9C illustrates another schematic top view of the spatial light modulator as illustrated in FIG. 9A, where four pixel electrodes 11 in a pixel group correspond to one through-hole (first through-hole) V located proximate to the center of the pixel group and covering the pixel group; and the photo spacer 40 is located in the through-hole (first through-hole) V, and the reflecting electrodes 13 running through a part of the through-hole (first through-hole) V are electrically connected with their corresponding pixel electrodes 11.

Optionally if four pixel electrodes in a pixel group correspond to one through-hole, then the aperture opening ratio of the pixels may be further improved over four pixel electrodes corresponding to four through-holes, particularly because the through-hole process is so restricted that if four pixel electrodes correspond to four through-holes, then the size of each through-hole may not be too small, but if four smaller through-holes are merged into one larger through-hole, then the area of the larger through-hole may be reduced as appropriate from the perspective of the through-hole process, so that the area occupied by the through-hole becomes smaller, thus improving the opening-to-pixel of the pixel. However if four smaller through-holes are merged into one larger through-hole, then the insulation between adjacent reflecting electrodes will be considered.

Optionally in the spatial light modulator according to some embodiments of the application, as illustrated in FIG. 9A, the distance s1 between the sidewall of a through-hole (first through-hole) V, and the photo spacer 40 located in the through-hole (first through-hole) V is more than the thickness of a reflecting electrode 13. If the distance s1 between the sidewall of the through-hole (first through-hole) V, and the photo spacer 40 located in the through-hole (first through-hole) V is equal to the thickness of the reflecting electrode 13, then only one layer of reflecting electrodes 13 on the sidewall may be accommodated in the through-hole (first through-hole) V in addition to the photo spacer 40. Given the area of the photo spacer 40, if the distance s1 between the sidewall of the through-hole (first through-hole) V, and the photo spacer 40 located in the through-hole (first through-hole) V is set more than the thickness of the reflecting electrode 13, then on one hand, more reflecting electrodes 13 may be accommodated in the through-hole (first through-hole) V to thereby facilitate an increased contact area between the reflecting electrodes 13 and the pixel electrodes 11; and on the other hand, the reflecting electrodes being fabricated need to be patterned by spacing four reflecting electrodes 13 from each other in the through-hole (first through-hole) V, but the four reflecting electrodes 13 may be insufficiently etched so that a part thereof may remain. Accordingly the distance s1 between the sidewall of the through-hole (first through-hole) V, and the photo spacer 40 located in the through-hole (first through-hole) V is set more than the thickness of the reflecting electrode 13, so that there will be a larger distance between the adjacent reflecting electrodes 13 in the through-hole (first through-hole) V to thereby facilitate insulation of the adjacent reflecting electrodes 13 from each other.

Optionally in the spatial light modulator according to some embodiments of the application, as illustrated in FIG. 9A, there is a preset distance s2 between the photo spacer 40 located in the through-hole (first through-hole) V, and the reflecting electrodes 13 running through the through-hole (first through-hole) V, thus increasing the distance between the adjacent reflecting electrodes 13 so as to facilitate insulation of the adjacent reflecting electrodes 13 from each other.

Optionally in the spatial light modulator according to some embodiments of the application, as illustrated in FIG. 9B and FIG. 9C, the shape of the opening of the through-hole (first through-hole) V is a central symmetric pattern, e.g., a square, a circle, etc., so that there is the same area occupied by the through-hole (first through-hole) V in each pixel to thereby ensure the same aperture opening ratio in each pixel.

Optionally in the spatial light modulator according to some embodiments of the application, as illustrated in FIG. 9B and FIG. 9C, the shape of the opening of the through-hole (first through-hole) V is similar to the shape of the orthographic projection of the photo spacer 40 onto the array substrate to thereby facilitate reasonable use of the area of the through-hole so as to increase the contact area between the photo spacer and the film layer thereunder while the reflecting electrodes 13 well contact the pixel electrodes 11, thus improving the stability of the photo spacer 40.

Optionally in the spatial light modulator according to some embodiments of the application, as illustrated in FIG. 9B and FIG. 9C, the shape of the orthographic projection of the photo spacer 40 onto the array substrate 10 is a central symmetric pattern. The center of the photo spacer 40 is located at the center of the pixel group, so that there may be the same area occupied by the photo spacer 40 in each pixel, and as a consequence, there may be the same space reserved in the through-hole for each reflecting electrode 13, thus facilitating a fabrication process thereof on one hand, and the same contact resistance between each reflecting electrode 13 and its corresponding pixel electrode 11 on the other hand.

Those skilled in the art shall appreciate that in the spatial light modulator according to some embodiments of the application, the pattern of the black matrix layer can be preset as needed for a particular panel design of the shapes of the covered through-holes and the photo spacer, etc., although some embodiments of the application will not be limited thereto.

The particular relative positional relationship between the photo spacer and the through-holes in the spatial light modulator according to some embodiments of the application has been described above. The other devices or film layers in the spatial light modulator will be introduced below in brief.

Optionally in the respective spatial light modulators above according to some embodiments of the application, the array substrate includes a base substrate, and thin film transistors corresponding to the respective pixel electrodes, and an insulation layer covering the thin film transistors, which are located on the base substrate, where the pixel electrodes are electrically connected with their corresponding thin film transistors through through-holes (second through-holes) running through the insulation layer. For example, as illustrated in FIG. 10 which is a schematic cross sectional view of a further spatial light modulator according to some embodiments of the application, the array substrate 10 includes a base substrate 101, and thin film transistors 102 corresponding to the respective pixel electrodes 11, and an insulation layer 103 covering the thin film transistors 102, which are located on the base substrate 101, where the pixel electrodes 11 are electrically connected with their corresponding thin film transistors 102 through the through-holes running through the insulation layer 103.

Optionally the gates of the thin film transistors are generally connected with the scan lines, the sources or drains of the thin film transistors are connected with the data lines, and the drains or sources of the thin film transistors are connected with the pixel electrodes; and when a scan signal is output over the scan lines, the pixel electrodes are charged by a signal over the data lines through the thin film transistors.

Figure 10:
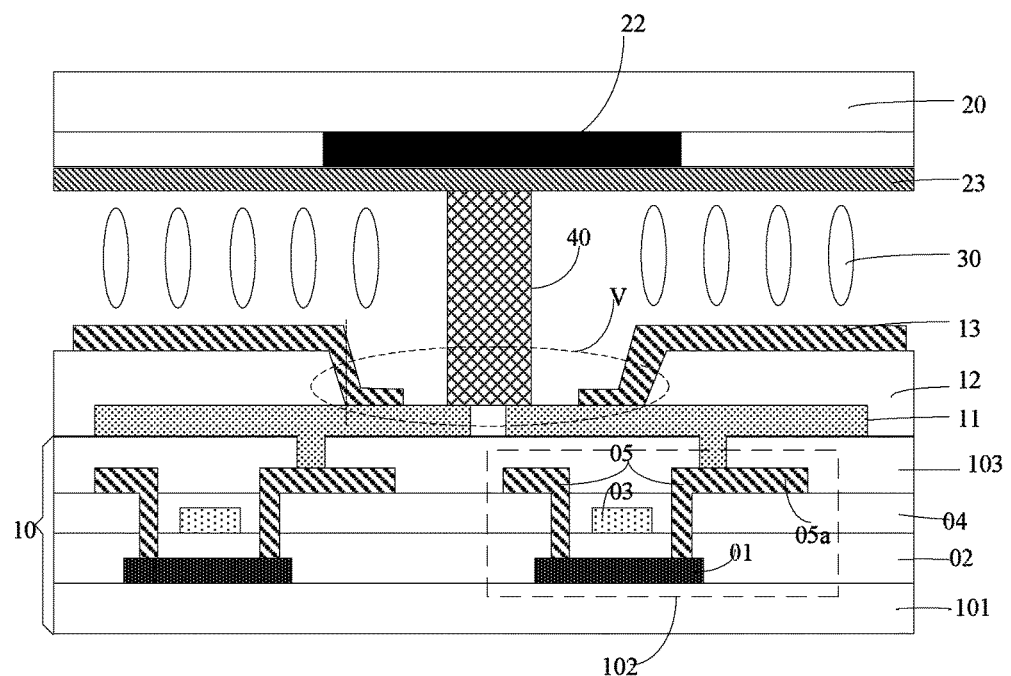
FIG. 10 illustrates a schematic structural diagram of a cross section of a further spatial light modulator according to some embodiments of the application.

Optionally in the respective spatial light modulators above according to some embodiments of the application, as illustrated in FIG. 10, a thin film transistor 103 includes a channel layer 01, a gate insulation layer 02, a gate electrode 03, an interlayer media layer 04, and a source-drain electrode 05, which are located on the base substrate 101 successively, where the source-drain electrode 05 is electrically connected with the channel layer 01 through a through-hole (third through-hole) running through the interlayer medium layer 04 and the gate insulation layer 02, and the pixel electrodes 11 are electrically connected with the drain electrodes 05a in the source-drain electrodes 05 through through-holes running through the insulation layer 103.

Optionally in the respective spatial light modulators above according to some embodiments of the application, as illustrated in FIG. 10, the spatial light modulators further include a first common electrode 23 between the black matrix layer 22 and the photo spacer 40. An operating principle of the spatial light modulators is to apply voltage to the pixel electrodes 11 and the first common electrode 23 so that an electric field is created between the pixel electrodes 11 and the first common electrode 21, and liquid crystal molecules are deflected by the electric field, where they are deflected differently with the varying electric field so that varying light is output from the differently deflected liquid crystal molecules, thus enabling the light to be modulated. The voltage on the respective pixel electrodes 11 is determined by digital holographic information, in which amplitude and phase information of a light wave of an object is recorded, received by the spatial light modulators.

Figure 11:
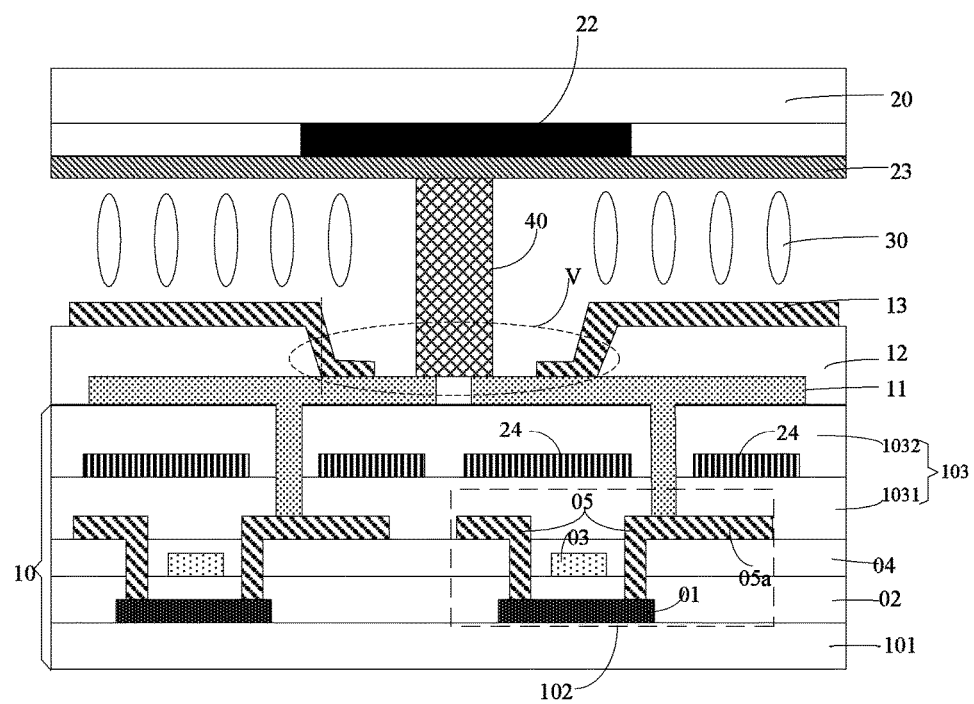
FIG. 11 illustrates a schematic structural diagram of a cross section of a further spatial light modulator according to some embodiments of the application.

Optionally in the respective spatial light modulators above according to some embodiments of the application, as illustrated in FIG. 11, the insulation layer 103 includes a first insulation layer 1031 and a second insulation layer 1032, which are located above the thin film transistors 102, and the first insulation layer 1031 is located between the thin film transistors 102 and the second insulation layer 1032; and The spatial light modulator further includes second common electrodes 24 located between the first insulation layer 1031 and the second insulation layer 1032. Orthographic projections of the second common electrodes 24 onto the base substrate 101 overlaps with orthographic projections of the pixel electrodes 11 onto the base substrate 101, so that the second common electrodes 24 are increased to create capacitances between the second common electrodes 23 and the pixel electrodes 11 to thereby increase storage capacitances.

Optionally in the respective spatial light modulators above according to some embodiments of the application, as illustrated in FIG. 11, orthographic projections of the second common electrodes 24 onto the base substrate 101 overlap with orthographic projections of the source-drain electrodes 05 of the thin film transistors 102 onto the base substrate 101, so that storage capacitances can also be created between the second common electrodes 24 and the source-drain electrodes 05.

Based upon the same inventive idea, some embodiments of the application further provide a display device including the spatial light modulator according to some embodiment of the application, and since the display device addresses the problem under a similar principle to the spatial light modulator as described above, reference can be made to the implementation of the spatial light modulator as described above for an implementation of the display device, and a repeated description thereof will be omitted here.

Figure 12:
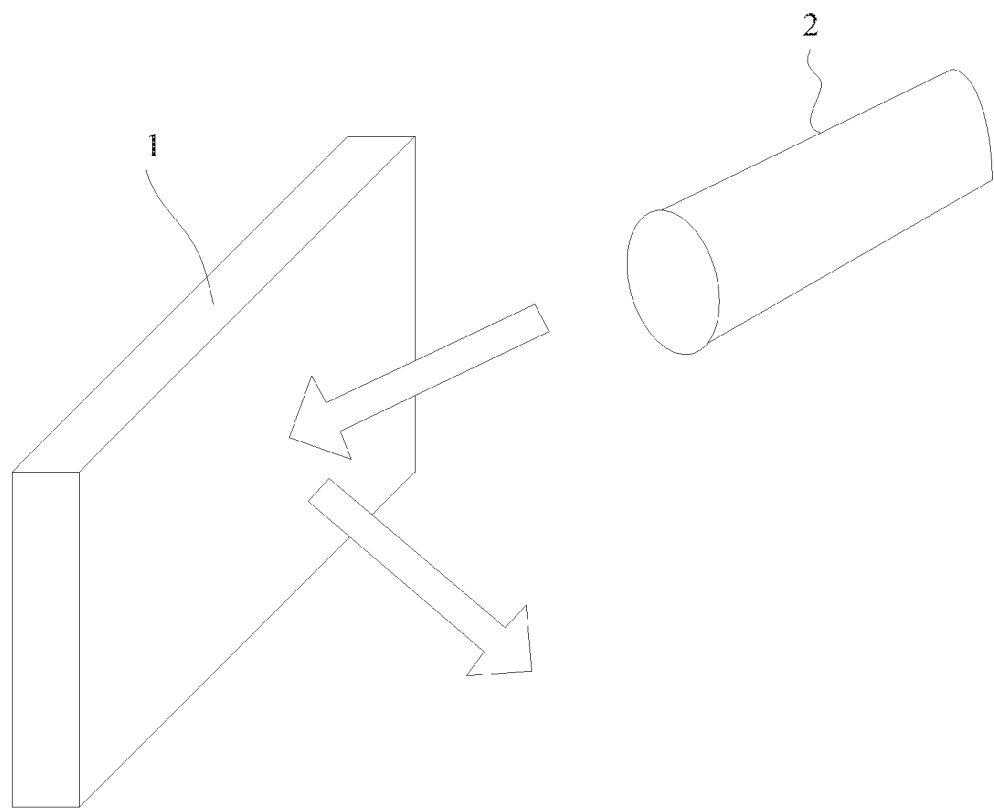
FIG. 12 is a schematic structural diagram of a display device according to some embodiments of the application.

Optionally as illustrated in FIG. 12, the display device is a holographic display device including a laser device 20 in addition to the spatial light modulator 1, where the laser device provides the spatial light modulator 1 with the reference light wave. The spatial light modulator 1 is controlled by the signal of the signal source to control the liquid crystals to be deflected, using the electric field between the pixel electrodes and the common electrode, to thereby control the light wave to be output, that is, the reference light wave is modulated and then output by the spatial light modulator 1.

In the spatial light modulator and the display device as described above according to some embodiments of the application, 2*2 adjacent pixel electrodes are a pixel group, through-holes corresponding to the respective pixel electrodes are located proximate to the center of the pixel group, and a photo spacer is located at the center of the pixel group, so that the photo spacer can overlap with the through-holes, or the photo spacer can be arranged in close proximity to the through-holes. If the photo spacer overlaps with the through-holes, then a black matrix layer covering the photo spacer, and a black matrix layer covering the surrounding of the photo spacer may cover at least a part of the through-holes; and if the photo spacer is arranged in close proximity to the through-holes, then the black matrix layer covering the surrounding of the photo spacer may cover at least a part of the through-holes (first through-holes) V. As compared with the prior art in which the black matrix layer covering the through-holes does not overlap with the black matrix layer covering the photo spacer, the area of the black matrix layer can be significantly reduced to thereby improve the aperture opening ratio in the spatial light modulator.

Evidently those skilled in the art can make various modifications and variations to the application without departing from the spirit and scope of the application. Accordingly the application is also intended to encompass these modifications and variations thereto so long as the modifications and variations come into the scope of the claims appended to the application and their equivalents.

The invention claimed is:

1. A spatial light modulator, comprising:
an array substrate and an upper substrate, which are arranged opposite to each other, and a liquid crystal layer and a photo spacer, which are located between the array substrate and the upper substrate; wherein a plurality of pixel electrodes arranged in a matrix, a planarization layer covering the pixel electrodes, and reflecting electrodes located on the planarization layer and corresponding to each of the pixel electrodes are arranged on the array substrate, and each of the reflecting electrodes is electrically connected with its corresponding pixel electrode through a first through-hole running through the planarization layer; and
2*2 adjacent pixel electrodes are a pixel group, the first through-hole corresponding to each of the pixel electrodes is located proximate to a center of the pixel group, and the photo spacer is located at the center of the pixel group;
wherein an orthographic projection of the photo spacer onto the array substrate overlaps with an orthographic projection of the first through-hole onto the array substrate.

2. The spatial light modulator according to claim 1, wherein each of the pixel electrodes in the pixel group corresponds to one first through-hole, the pixel group corresponds to four first through-holes, and each of the four first through-holes is located proximate to the center of the pixel group; and
the photo spacer is located on the planarization layer among the four first through-holes.

3. The spatial light modulator according to claim 2, wherein the orthographic projection of the photo spacer onto the array substrate partially overlaps with orthographic projections of the four first through-holes corresponding to the pixel group onto the array substrate.

4. The spatial light modulator according to claim 2, wherein any adjacent two of the four first through-holes corresponding to the pixel group are axial symmetry.

5. The spatial light modulator according to claim 4, wherein a shape of openings of the four first through-holes is rectangle or triangle.

6. The spatial light modulator according to claim 4, wherein a shape of openings of the four first through-holes is such a rectangle that a corner thereof proximate to the photo spacer is rounded.

7. The spatial light modulator according to claim 1, wherein the four pixel electrodes in the pixel group correspond to one first through-hole which is located proximate to the center of the pixel group and covers the center of the pixel group; and
the photo spacer is located in the first through-hole, and each of the reflecting electrodes is electrically connected with its corresponding pixel electrode by running through a part of the first through-hole.

8. The spatial light modulator according to claim 7, wherein a distance between a sidewall of the first through-hole and the photo spacer located in the first through-hole is greater than a thickness of the reflecting electrode.

9. The spatial light modulator according to claim 8, wherein there is a preset distance between the photo spacer located in the first through-hole, and the reflecting electrode running through the first through-hole.

10. The spatial light modulator according to claim 7, wherein a shape of opening of the first through-hole is a central symmetric pattern.

11. The spatial light modulator according to claim 7, wherein a shape of opening of the first through-hole is similar to a shape of an orthographic projection of the photo spacer onto the array substrate.

12. The spatial light modulator according to claim 1, wherein a shape of an orthographic projection of the photo spacer onto the array substrate is a central symmetric pattern.

13. The spatial light modulator according to claim 1, further comprises a black matrix layer located between the photo spacer and the upper substrate, and an orthographic projection of the black matrix layer onto the array substrate covers orthographic projections of the photo spacer and the first through-hole onto the array substrate.

14. The spatial light modulator according to claim 13, wherein the photo spacer is fixed on a side of the black matrix layer, wherein the side faces to the liquid crystal layer.

15. The spatial light modulator according to claim 14, wherein the array substrate comprises an base substrate, and thin film transistors which are located on the base substrate correspond to each of the pixel electrodes, and an insulation layer covering the thin film transistors; and each of the pixel electrodes is electrically connected with its corresponding thin film transistor through a second through-hole which runs through the insulation layer.

16. The spatial light modulator according to claim 15, wherein a thin film transistor comprises a channel layer, a gate insulation layer, a gate electrode, an interlayer media layer, a source electrode, and a drain electrode, which are located on the base substrate successively, wherein the source electrode and the drain electrode are electrically connected with the channel layer through a third through-hole running through the interlayer medium layer and the gate insulation layer, and the pixel electrodes are electrically connected with the drain electrodes through the second through-holes.

17. The spatial light modulator according to claim 15, further comprises a first common electrode between the black matrix layer and the photo spacer.

18. The spatial light modulator according to claim 17, wherein the insulation layer comprises a first insulation layer and a second insulation layer, which are located above the thin film transistors;
   wherein the first insulation layer is located between the thin film transistors and the second insulation layer;
   the spatial light modulator further comprises a second common electrode located between the first insulation layer and the second insulation layer.

19. A display device, comprising:
   a spatial light modulator, comprising:
   an array substrate and an upper substrate, which are arranged opposite to each other, and a liquid crystal layer and a photo spacer, which are located between the array substrate and the upper substrate; wherein a plurality of pixel electrodes arranged in a matrix, a planarization layer covering the pixel electrodes, and reflecting electrodes located on the planarization layer and corresponding to each of the pixel electrodes are arranged on the array substrate, and each of the reflecting electrodes is electrically connected with its corresponding pixel electrode through a first through-hole running through the planarization layer; and
   2*2 adjacent pixel electrodes are a pixel group, the first through-hole corresponding to each of the pixel electrodes is located proximate to a center of the pixel group, and the photo spacer is located at the center of the pixel group;
   wherein an orthographic projection of the photo spacer onto the array substrate overlaps with an orthographic projection of the first through-hole onto the array substrate.

* * * * *